(12) United States Patent
Cook et al.

(10) Patent No.: US 8,373,514 B2
(45) Date of Patent: Feb. 12, 2013

(54) WIRELESS POWER TRANSFER USING MAGNETO MECHANICAL SYSTEMS

(75) Inventors: Nigel P. Cook, El Cajon, CA (US);
Stephen Dominiak, Mägenwil (CH);
Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 12/250,015

(22) Filed: Oct. 13, 2008

(65) Prior Publication Data

US 2009/0167449 A1   Jul. 2, 2009

Related U.S. Application Data (60) Provisional application No. 60/979,381, filed on Oct. 11, 2007.

(51) Int. Cl.
*H03B 5/40* (2006.01)
*H02K 35/02* (2006.01)

(52) U.S. Cl. .......... 331/157; 331/154; 307/104; 310/36; 310/37; 310/40 R; 310/49.02; 310/49.03; 323/305

(58) Field of Classification Search ............ 331/154, 331/157; 307/104; 310/10, 15, 26, 36, 37, 310/40 R, 46, 48, 49.02, 49.03, 102 R, 113–117, 310/168, 171, 181; 323/305, 318; 322/3, 322/5, 6, 9, 10, 46, 47, 49, 51, 52
See application file for complete search history.

(56) References Cited

U.S. PATENT DOCUMENTS

| | | | |
|---|---|---|---|
| 3,098,971 | A | 7/1963 | Richardson |
| 3,480,229 | A | 11/1969 | Entremont |
| 3,588,905 | A | 6/1971 | Dunlavy, Jr. |
| 3,675,108 | A | 7/1972 | Nicholl |
| 3,918,062 | A | 11/1975 | Haruki et al. |
| 3,938,018 | A | 2/1976 | Dahl |
| 3,999,185 | A | 12/1976 | Polgar, Jr. et al. |
| 4,088,999 | A | 5/1978 | Fletcher et al. |
| 4,388,524 | A | 6/1983 | Walton |
| 4,390,924 | A | 6/1983 | Nebiker, Jr. |
| 4,473,825 | A | 9/1984 | Walton |
| 4,524,411 | A | 6/1985 | Willis |
| 4,914,539 | A | 4/1990 | Turner et al. |

(Continued)

FOREIGN PATENT DOCUMENTS

| | | |
|---|---|---|
| CN | 1202025 A | 12/1998 |
| CN | 1231069 A | 10/1999 |

(Continued)

OTHER PUBLICATIONS

"Wireless Non-Radiative Energy Transfer", MIT paper, publication and date unknown, believed to be 2007.

(Continued)

*Primary Examiner* — Levi Gannon
(74) *Attorney, Agent, or Firm* — Knobbe Martens Olson & Bear LLP (57) ABSTRACT

Wireless power transfer is received using a magneto mechanical system. A magneto mechanical system may include an array of magneto-mechanical oscillators, wherein each oscillator may comprise a magnetic symmetrical part and a suspension engaged to the magnetic part. The system may further include a coil formed around the array and electromagnetically coupled to the oscillators to produce an electric current caused by electromagnetic coupling with the oscillators.

36 Claims, 4 Drawing Sheets

Induction Coil

U.S. PATENT DOCUMENTS

| | | | |
|---|---|---|---|
| 4,959,568 A * | 9/1990 | Stokes | 310/51 |
| 4,959,764 A | 9/1990 | Bassett | |
| 5,027,709 A | 7/1991 | Slagle | |
| 5,072,233 A | 12/1991 | Zanzig | |
| 5,153,583 A | 10/1992 | Murdoch | |
| 5,175,561 A | 12/1992 | Goto | |
| 5,387,818 A * | 2/1995 | Leibowitz | 290/1 R |
| 5,396,538 A | 3/1995 | Hong | |
| 5,397,962 A | 3/1995 | Moslehi | |
| 5,438,699 A | 8/1995 | Coveley | |
| 5,450,305 A | 9/1995 | Boys et al. | |
| 5,455,466 A | 10/1995 | Parks et al. | |
| 5,491,715 A | 2/1996 | Flaxl | |
| 5,519,262 A | 5/1996 | Wood | |
| 5,596,567 A | 1/1997 | DeMuro et al. | |
| 5,608,417 A | 3/1997 | De Vall | |
| 5,621,322 A | 4/1997 | Ehnholm | |
| 5,654,621 A | 8/1997 | Seelig | |
| 5,684,828 A | 11/1997 | Bolan et al. | |
| 5,734,255 A * | 3/1998 | Thompson et al. | 322/7 |
| 5,767,601 A * | 6/1998 | Uchiyama | 310/190 |
| 5,796,240 A * | 8/1998 | Saito et al. | 322/10 |
| 5,821,638 A | 10/1998 | Boys et al. | |
| 5,856,710 A | 1/1999 | Baughman et al. | |
| 5,936,575 A | 8/1999 | Azzarelli et al. | |
| 5,963,012 A | 10/1999 | Garcia et al. | |
| 5,966,941 A | 10/1999 | Ghoshal | |
| 5,975,714 A * | 11/1999 | Vetorino et al. | 362/192 |
| 5,982,139 A | 11/1999 | Parise | |
| 6,016,046 A | 1/2000 | Kaite et al. | |
| 6,028,413 A | 2/2000 | Brockmann | |
| 6,031,708 A | 2/2000 | Guermeur | |
| 6,040,680 A | 3/2000 | Toya et al. | |
| 6,040,986 A | 3/2000 | Sakamoto et al. | |
| 6,104,354 A | 8/2000 | Hill et al. | |
| 6,114,834 A | 9/2000 | Parise | |
| 6,127,799 A | 10/2000 | Krishnan | |
| 6,175,124 B1 | 1/2001 | Cole et al. | |
| 6,184,651 B1 | 2/2001 | Fernandez et al. | |
| 6,265,789 B1 | 7/2001 | Honda et al. | |
| 6,275,681 B1 | 8/2001 | Vega et al. | |
| 6,291,901 B1 * | 9/2001 | Cefo | 290/1 R |
| 6,317,338 B1 | 11/2001 | Boys | |
| 6,337,628 B2 | 1/2002 | Campana, Jr. | |
| 6,341,076 B1 | 1/2002 | Kadatskyy et al. | |
| 6,411,824 B1 | 6/2002 | Eidson | |
| 6,437,685 B2 | 8/2002 | Hanaki | |
| 6,507,152 B2 | 1/2003 | Matsumoto et al. | |
| 6,523,493 B1 | 2/2003 | Brcka | |
| 6,556,054 B1 | 4/2003 | Goodman et al. | |
| 6,633,026 B2 | 10/2003 | Tuominen | |
| 6,636,146 B1 | 10/2003 | Wehoski | |
| 6,670,864 B2 | 12/2003 | Hyvonen et al. | |
| 6,798,716 B1 | 9/2004 | Charych | |
| 6,803,744 B1 | 10/2004 | Sabo | |
| 6,879,076 B2 * | 4/2005 | Long | 310/156.38 |
| 6,891,287 B2 * | 5/2005 | Moret | 310/36 |
| 6,912,137 B2 | 6/2005 | Berghegger | |
| 6,960,968 B2 | 11/2005 | Odendaal et al. | |
| 6,965,352 B2 | 11/2005 | Ohara et al. | |
| 6,967,462 B1 | 11/2005 | Landis | |
| 6,972,542 B2 | 12/2005 | Patino et al. | |
| 6,972,543 B1 | 12/2005 | Wells | |
| 7,012,405 B2 | 3/2006 | Nishida et al. | |
| 7,068,991 B2 | 6/2006 | Parise | |
| 7,076,206 B2 | 7/2006 | Elferich et al. | |
| 7,095,301 B2 | 8/2006 | Hidaka et al. | |
| 7,110,462 B2 | 9/2006 | Monsen | |
| 7,116,018 B2 * | 10/2006 | Strobl | 310/36 |
| 7,154,451 B1 | 12/2006 | Sievenpiper | |
| 7,164,344 B2 | 1/2007 | Deguchi et al. | |
| 7,167,139 B2 | 1/2007 | Kim et al. | |
| 7,180,265 B2 | 2/2007 | Naskali et al. | |
| 7,180,291 B2 | 2/2007 | Chmielewski et al. | |
| 7,209,792 B1 | 4/2007 | Parramon et al. | |
| 7,212,414 B2 | 5/2007 | Baarman | |
| 7,215,061 B2 | 5/2007 | Kihara et al. | |
| 7,248,165 B2 | 7/2007 | Collins et al. | |
| 7,256,532 B2 | 8/2007 | Viehland et al. | |
| 7,262,701 B1 | 8/2007 | Nguyen | |
| 7,380,150 B2 | 5/2008 | Meier et al. | |
| 7,423,518 B2 | 9/2008 | Yamada | |
| 7,511,500 B2 | 3/2009 | Schiano et al. | |
| 7,525,283 B2 | 4/2009 | Cheng et al. | |
| 7,554,316 B2 | 6/2009 | Stevens et al. | |
| 7,598,646 B2 * | 10/2009 | Cleveland | 310/156.43 |
| 7,675,197 B2 | 3/2010 | Tetlow | |
| 7,676,263 B2 | 3/2010 | Harris et al. | |
| 7,684,868 B2 | 3/2010 | Tai et al. | |
| 7,741,734 B2 | 6/2010 | Joannopoulos et al. | |
| 7,755,552 B2 | 7/2010 | Schantz et al. | |
| 7,760,151 B2 | 7/2010 | Poilasne et al. | |
| 7,777,396 B2 * | 8/2010 | Rastegar et al. | 310/339 |
| 7,825,543 B2 | 11/2010 | Karalis et al. | |
| 7,839,124 B2 | 11/2010 | Yamazaki et al. | |
| 7,844,306 B2 | 11/2010 | Shearer et al. | |
| 7,868,482 B2 | 1/2011 | Greene et al. | |
| 7,885,050 B2 | 2/2011 | Lee | |
| 8,055,310 B2 | 11/2011 | Beart et al. | |
| 8,159,412 B2 | 4/2012 | Yun et al. | |
| 2001/0012208 A1 | 8/2001 | Boys | |
| 2001/0026244 A1 | 10/2001 | Ieda et al. | |
| 2001/0029167 A1 | 10/2001 | Takeda et al. | |
| 2002/0017979 A1 | 2/2002 | Krause et al. | |
| 2002/0036977 A1 | 3/2002 | Lenssen et al. | |
| 2002/0057161 A1 | 5/2002 | Katsura et al. | |
| 2002/0057584 A1 | 5/2002 | Brockmann | |
| 2002/0160722 A1 | 10/2002 | Terranova et al. | |
| 2002/0190908 A1 | 12/2002 | Andrews et al. | |
| 2003/0090353 A1 | 5/2003 | Robinson et al. | |
| 2003/0162566 A1 | 8/2003 | Shapira et al. | |
| 2003/0174099 A1 | 9/2003 | Bauer et al. | |
| 2003/0193438 A1 | 10/2003 | Yoon | |
| 2003/0199778 A1 | 10/2003 | Mickle et al. | |
| 2004/0001029 A1 | 1/2004 | Parsche et al. | |
| 2004/0130425 A1 | 7/2004 | Dayan et al. | |
| 2004/0150521 A1 | 8/2004 | Stilp | |
| 2004/0160323 A1 | 8/2004 | Stilp | |
| 2004/0204781 A1 | 10/2004 | Hsien | |
| 2004/0212500 A1 | 10/2004 | Stilp | |
| 2004/0227002 A1 | 11/2004 | Watanabe | |
| 2004/0227057 A1 | 11/2004 | Tuominen et al. | |
| 2004/0227619 A1 | 11/2004 | Watanabe | |
| 2005/0007239 A1 | 1/2005 | Woodard et al. | |
| 2005/0017677 A1 | 1/2005 | Burton et al. | |
| 2005/0029351 A1 | 2/2005 | Yoshinaga et al. | |
| 2005/0043055 A1 | 2/2005 | Vance | |
| 2005/0057422 A1 | 3/2005 | Deguchi et al. | |
| 2005/0075697 A1 | 4/2005 | Olson et al. | |
| 2005/0104457 A1 | 5/2005 | Jordan et al. | |
| 2005/0125093 A1 | 6/2005 | Kikuchi et al. | |
| 2005/0127867 A1 | 6/2005 | Calhoon et al. | |
| 2005/0131495 A1 | 6/2005 | Parramon et al. | |
| 2005/0194926 A1 | 9/2005 | Di Stefano | |
| 2005/0273143 A1 | 12/2005 | Kanzius et al. | |
| 2006/0017438 A1 | 1/2006 | Mullen et al. | |
| 2006/0061325 A1 | 3/2006 | Tang et al. | |
| 2006/0071790 A1 | 4/2006 | Duron et al. | |
| 2006/0094449 A1 | 5/2006 | Goldberg | |
| 2006/0103355 A1 | 5/2006 | Patino et al. | |
| 2006/0113955 A1 | 6/2006 | Nunally | |
| 2006/0125703 A1 | 6/2006 | Ma et al. | |
| 2006/0145659 A1 | 7/2006 | Patino et al. | |
| 2006/0145660 A1 | 7/2006 | Black et al. | |
| 2006/0159536 A1 | 7/2006 | Pu | |
| 2006/0160517 A1 | 7/2006 | Yoon | |
| 2006/0164312 A1 | 7/2006 | Mathieu | |
| 2006/0208903 A1 | 9/2006 | Loh et al. | |
| 2006/0239043 A1 | 10/2006 | Ohbo | |
| 2006/0273756 A1 | 12/2006 | Bowling et al. | |
| 2007/0010295 A1 | 1/2007 | Greene et al. | |
| 2007/0046433 A1 | 3/2007 | Mukherjee | |
| 2007/0054705 A1 | 3/2007 | Liow et al. | |
| 2007/0060221 A1 | 3/2007 | Burgan et al. | |
| 2007/0082611 A1 | 4/2007 | Terranova et al. | |
| 2007/0091006 A1 | 4/2007 | Thober et al. | |
| 2007/0096910 A1 | 5/2007 | Waters | |

| Publication | Date | Inventor | Country | Number | Date |
|---|---|---|---|---|---|
| 2007/0103291 A1 | 5/2007 | Adams | DE | 19509918 A1 | 9/1996 |
| 2007/0105524 A1 | 5/2007 | Fullam et al. | DE | 19729722 | 1/1999 |
| 2007/0114945 A1 | 5/2007 | Mattaboni et al. | DE | 19938460 | 2/2001 |
| 2007/0120678 A1 | 5/2007 | Posamentier | DE | 102004009896 | 9/2005 |
| 2007/0126395 A1 | 6/2007 | Suchar | DE | 102005053111 | 5/2007 |
| 2007/0126650 A1 | 6/2007 | Guenther | EP | 568920 | 10/1993 |
| 2007/0135078 A1 | 6/2007 | Ljung | EP | 298707 | 9/1994 |
| 2007/0139000 A1 | 6/2007 | Kozuma et al. | EP | 724308 | 7/1996 |
| 2007/0145830 A1 | 6/2007 | Lee et al. | EP | 773509 | 4/2002 |
| 2007/0146218 A1 | 6/2007 | Turner et al. | EP | 1302822 | 4/2003 |
| 2007/0156204 A1 | 7/2007 | Denker et al. | EP | 1315051 | 5/2003 |
| 2007/0164414 A1 | 7/2007 | Dokai et al. | EP | 1003266 B1 | 4/2006 |
| 2007/0171681 A1 | 7/2007 | Baarman | EP | 1413975 | 5/2007 |
| 2007/0178945 A1 | 8/2007 | Cook et al. | EP | 1892799 | 2/2008 |
| 2007/0188326 A1 | 8/2007 | Pluss et al. | GB | 1280516 | 7/1972 |
| 2007/0205881 A1 | 9/2007 | Breed | GB | 1343071 | 1/1974 |
| 2007/0214940 A1 | 9/2007 | Stoneback | GB | 2070298 | 9/1981 |
| 2007/0222542 A1 | 9/2007 | Joannopoulos | GB | 2318696 | 4/1998 |
| 2007/0281625 A1 | 12/2007 | Boys | JP | 57032144 | 2/1982 |
| 2007/0296393 A1 | 12/2007 | Malpas et al. | JP | 62071430 A | 4/1987 |
| 2007/0298846 A1 | 12/2007 | Greene et al. | JP | 1298901 A | 12/1989 |
| 2008/0003963 A1 | 1/2008 | Turner | JP | 4115606 A | 4/1992 |
| 2008/0014897 A1 | 1/2008 | Cook et al. | JP | 04271201 | 9/1992 |
| 2008/0054638 A1 | 3/2008 | Greene et al. | JP | 5038232 A | 2/1993 |
| 2008/0067874 A1 | 3/2008 | Tseng | JP | 05183318 | 7/1993 |
| 2008/0074083 A1* | 3/2008 | Yarger et al. ............ 320/137 | JP | 6044207 A | 2/1994 |
| 2008/0093934 A1 | 4/2008 | Kato | JP | 06133476 | 5/1994 |
| 2008/0108862 A1 | 5/2008 | Jordan et al. | JP | 6044207 U | 6/1994 |
| 2008/0122294 A1 | 5/2008 | Simon et al. | JP | 6303726 | 10/1994 |
| 2008/0122297 A1 | 5/2008 | Arai | JP | 6327172 A | 11/1994 |
| 2008/0129147 A1 | 6/2008 | Thiesen et al. | JP | 6339232 | 12/1994 |
| 2008/0167755 A1 | 7/2008 | Curt | JP | 8033244 A | 2/1996 |
| 2008/0186129 A1 | 8/2008 | Fitzgibbon | JP | 8079976 | 3/1996 |
| 2008/0191897 A1 | 8/2008 | McCollough | JP | 8088942 | 4/1996 |
| 2008/0211320 A1 | 9/2008 | Cook et al. | JP | 8130840 A | 5/1996 |
| 2008/0211455 A1 | 9/2008 | Park et al. | JP | 8162689 A | 6/1996 |
| 2008/0225564 A1 | 9/2008 | Bohm et al. | JP | 9037475 | 7/1997 |
| 2008/0293446 A1 | 11/2008 | Rofougaran et al. | JP | 9182322 | 7/1997 |
| 2008/0296978 A1 | 12/2008 | Finkenzeller et al. | JP | 10097931 | 4/1998 |
| 2008/0309452 A1 | 12/2008 | Zeine | JP | 10225020 | 8/1998 |
| 2009/0002175 A1 | 1/2009 | Waters | JP | 11143600 | 5/1999 |
| 2009/0009177 A1 | 1/2009 | Kim et al. | JP | 11191146 | 7/1999 |
| 2009/0026907 A1 | 1/2009 | Davidowitz et al. | JP | 11215802 A | 8/1999 |
| 2009/0045772 A1 | 2/2009 | Cook et al. | JP | 11332135 | 11/1999 |
| 2009/0051224 A1 | 2/2009 | Cook et al. | JP | 2000078763 | 3/2000 |
| 2009/0052721 A1 | 2/2009 | Dabrowski | JP | 2000175379 | 6/2000 |
| 2009/0058361 A1 | 3/2009 | John | JP | 2000217279 | 8/2000 |
| 2009/0072627 A1 | 3/2009 | Cook et al. | JP | 2001024548 A | 1/2001 |
| 2009/0079268 A1 | 3/2009 | Cook et al. | JP | 2001197672 | 7/2001 |
| 2009/0102296 A1 | 4/2009 | Greene et al. | JP | 2001238372 A | 8/2001 |
| 2009/0102419 A1 | 4/2009 | Gwon et al. | JP | 2001264432 A | 9/2001 |
| 2009/0109102 A1 | 4/2009 | Dokai et al. | JP | 2001526374 A | 12/2001 |
| 2009/0111531 A1 | 4/2009 | Cui et al. | JP | 2002017058 A | 1/2002 |
| 2009/0121713 A1 | 5/2009 | Van Helvoort | JP | 2002078247 A | 3/2002 |
| 2009/0146892 A1 | 6/2009 | Shimizu et al. | JP | 2002508916 A | 3/2002 |
| 2009/0167449 A1 | 7/2009 | Cook et al. | JP | 2002320347 | 10/2002 |
| 2009/0204170 A1 | 8/2009 | Hastings et al. | JP | 2003047177 A | 2/2003 |
| 2009/0218884 A1 | 9/2009 | Soar | JP | 2003069335 A | 3/2003 |
| 2009/0243394 A1 | 10/2009 | Levine | JP | 2003189507 A | 7/2003 |
| 2009/0273242 A1 | 11/2009 | Cook | JP | 2004187429 A | 7/2004 |
| 2009/0299918 A1 | 12/2009 | Cook et al. | JP | 2005045298 A | 2/2005 |
| 2009/0308933 A1 | 12/2009 | Osada | JP | 2005137040 | 5/2005 |
| 2010/0013434 A1 | 1/2010 | Taylor-Haw et al. | JP | 2005261187 A | 9/2005 |
| 2010/0068998 A1 | 3/2010 | Zyambo et al. | JP | 2006042519 | 2/2006 |
| 2010/0109445 A1 | 5/2010 | Kurs et al. | JP | 2006510101 A | 3/2006 |
| 2010/0134366 A1 | 6/2010 | Yu | JP | 2006115592 A | 4/2006 |
| 2010/0176936 A1 | 7/2010 | Garber et al. | JP | 2006149163 A | 6/2006 |
| 2010/0277387 A1 | 11/2010 | Schantz et al. | JP | 2008508842 A | 3/2008 |
| 2010/0289331 A1 | 11/2010 | Shionoiri et al. | JP | 2009501510 A | 1/2009 |
| 2010/0289449 A1 | 11/2010 | Elo | JP | 2010539821 A | 12/2010 |
| 2010/0315045 A1 | 12/2010 | Zeine | KR | 102000017058 | 3/2000 |
| 2011/0031821 A1 | 2/2011 | Greene et al. | KR | 1020010001674 | 1/2001 |
| 2011/0050166 A1 | 3/2011 | Cook et al. | KR | 1020010030472 | 4/2001 |
| 2011/0069516 A1 | 3/2011 | Greene et al. | KR | 20020064451 A | 8/2002 |
| 2011/0074349 A1 | 3/2011 | Ghovanloo | KR | 20050016879 A | 2/2005 |
| | | | KR | 1020050019926 | 3/2005 |
| FOREIGN PATENT DOCUMENTS | | | KR | 20060070795 A | 6/2006 |
| CN | 2582188 Y | 10/2003 | KR | 20070017804 A | 2/2007 |
| DE | 4023412 | 2/1992 | WO | WO8807732 | 10/1988 |

| | | |
|---|---|---|
| WO | WO9619028 | 6/1996 |
| WO | WO9857413 A1 | 12/1998 |
| WO | WO9930090 A1 | 6/1999 |
| WO | WO9950780 | 10/1999 |
| WO | WO9950806 | 10/1999 |
| WO | WO0167413 | 9/2001 |
| WO | WO02060215 | 8/2002 |
| WO | WO03077364 A2 | 9/2003 |
| WO | WO2004038887 | 5/2004 |
| WO | WO2004052563 | 6/2004 |
| WO | WO2004077550 | 9/2004 |
| WO | WO2005086279 | 9/2005 |
| WO | WO2006006636 A1 | 1/2006 |
| WO | WO2006011769 A1 | 2/2006 |
| WO | WO2006031785 | 3/2006 |
| WO | WO2007008646 A2 | 1/2007 |
| WO | WO2007048052 | 4/2007 |
| WO | WO2007077442 | 7/2007 |

OTHER PUBLICATIONS

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

"Wireless Power Transfer via Strongly Coupled Magnetic Resonances", Kurs et al, scimag.org, Jul. 6, 2007.

Dong-Gi Youn et al, "A Study on the Fundamental Transmission Experiment for Wireless Power Transmission System," 1999 IEEE Conference, TENCON 99, vol. 2, pp. 1419-1422, Sep. 1999.

International Search Report and Written Opinion—PCT/US2008/079681, International Search Authority—European Patent Office—Jun. 8, 2009.

James O. McSpadden et al, "A High Conversion Efficiency 5.8 GHz Rectenna," 1997 IEEE Microwave Symposium, vol. 2, pp. 547-550, Jun. 1997.

James O. McSpadden et al, "Theoretical and Experimental Investigation of a Rectenna Element for Microwave Power Transmission," 1992 IEEE Transactions on Microwave Theory and Techniques, vol. 40, pp. 2359-2366, Dec. 1992.

Naoki Shinohara et al, "Experimental Study of Large Rectenna Array for Microwave Energy Transmission," 1998 IEEE Transactions on Microwave Theory and Techniques, vol. 46, pp. 261-268, Mar. 1998.

Tae-Whan Yoo et al, "Theoretical and Experimental Development of 10 and 35 GHz Rectennas," 1992 IEEE Transactions on Microwave Theory and Techniques, vol. 40, pp. 1259-1266, Jun. 1992.

Tsuyoshi Sekitani et al, "A Large-area Wireless Power-Transmission Sheet Using Printed Organic Transistors and Plastic MEMS Switches," Nature Materials Letter, pp. 413-417; Jan. 2007.

Chunbo, et al., "Research on the topology of wireless energy transfer device", Sch. of Electr. Eng. & Autom., Harbin Inst. of Technol., Harbin This paper appears in: Vehicle Power and Propulsion Conference, 2008. VPPC '08. IEEE Issue Date: Sep. 3-5, 2008 On p. 1 Print ISBN: 978-1-4244-1848-0 INSPEC Accession No. 10394615 Digital Object Identifier: 10.1109/VPPC.2008.4677798 Date of Current Version: Nov. 18, 2008.

Dudek, et al., "High permeability micro-magneto-mechanical systems," International Journal of Applied Electromagnetics and Mechanics (2007), vol. 25, pp. 103-108.

Finkenzeller, "RFID Handbook: Fundamentals and Applications in Contactless Smart Cards and Identification," Second Edition, Translated by Rachel Waddington, 2003, John Wiley & Sons Ltd., pp. 106-111.

Harrist, Wireless battery charging system using radio frequency energy harvesting, Master of Science Thesis, University of Pittsburgh, 2004.

Karalis et al., "Efficient wireless non-radiative mid-range energy transfer", Science Direct, Annals of Physics, 323(1), 34-48, Apr. 17, 2007. doi:10.1016/j.aop. Apr. 27, 2007.

Kim et al., "Electrically Small Magnetic Dipole Antennas With Quality Factors Approaching the Chu Lower Bound", Antennas and Propagation, IEEE Transactions on vol. 58 Issue: 6 Publication Date: Jun. 2010 pp. 1898-1906 Digital Object Identifier: 10.1109/TAP.2010.2046864.

Kim, et al., Switchable polymer-based thin film coils as a power module wireless neural interfaces, Sensors and Actuators, vol. A 136, Issue 1, May 2007 (available online Nov. 27, 2006), pp. 467-474.

Miranda et al., "Wireless power transfer using weakly coupled magnetostatic resonators", Energy Conversion Congress and Exposition (ECCE), 2010 IEEE Digital Object Identifier: 10.1109/ECCE.2010.5617728 Publication Year: 2010, pp. 4179-4186 IEEE Conferences.

Myers, et al., "A transcutaneous power transformer," Trans. Amer. Soc. Artif. Inter. Organs, vol. 14, 1968, pp. 210-219.

Onizuka, et al., A design methodology of chip-to-chip wireless power transmission system, Univ. of Tokyo, International Conference on Integrated Circuit Design and Technology, 2007 (ICICDT '07), IEEE, May-Jun. 2007, pp. 1-4.

Ozawa et al., "Wireless Energy Transmission for Micro Aerial Vehicles Using a Microwave Phased Array," 3rd International Energy Conversion Engineering Conference, Aug. 15-18, 2005, San Francisco, CA, pp. 1-6.

Yates et al., "Optimal transmission frequency for ultralow-power short-range radio links", Source: IEEE Transactions on Circuits and Systems I: Fundamental Theory and Applications, v 51, n 7, 1405-13, Jul. 2004; ISSN: 1057-7122; DOI: 10.1109/TCSI.2004.830696; Publisher: IEEE, USA Author affiliation: Dept. of Electr. & Electron. Eng., Imperial Coll. London, UK.

Schuder et al., "High Level electromagnetic energy transfer through a closed wall", Inst.Radio Engrs. Int.Conf Record 9, pp. 119-126, 1961.

Schuder, "Powering an artificial heart:Birth of the inductively coupled-radio frequency system in 1960", Artificial organs, vol. 26, No. 11, 2002, pp. 909-915.

Bayrashev, Andrey, et al., "Low frequency wireless powering of microsystems using piezoelectric-magnetostrictive laminate composites," Sensors & Actuators A: Physical, Sep. 2004, vol. 114, Issue 2/3, pp. 244-249.

* cited by examiner

WIRELESS POWER TRANSFER USING MAGNETO MECHANICAL SYSTEMS

This application claims priority from provisional application No. 60/979,381, filed Oct. 11, 2007, the entire contents of which disclosure is herewith incorporated by reference.

BACKGROUND

Our previous applications have described magneto mechanical systems. Previous applications by Nigel Power LLC have described a wireless powering and/or charging system using a transmitter that sends a magnetic signal with a substantially unmodulated carrier. A receiver extracts energy from the radiated field of the transmitter. The energy that is extracted can be rectified and used to power a load or charge a battery.

Our previous applications describe non-radiative transfer of electrical energy using coupled magnetic resonance. Non-radiative, means that both the receive and transmit antennas are "small" compared to the wavelength, and therefore have a low radiation efficiency with respect to Hertzian waves. High efficiency can be obtained between the transmit antenna and a receive antenna that is located within the near field of the transmit antenna.

SUMMARY

The present application describes techniques for capturing wireless power based on a magnetic transmission.

DETAILED DESCRIPTION

The classical principle of non-radiative energy transfer is based on Faraday's induction law. A transmitter forms a primary and a receiver forms a secondary separated by a transmission distance. The primary represents the transmit antenna generating an alternating magnetic field. The secondary represents the receive antenna that extracts electrical power from the alternating magnetic field using Faraday's induction law.

$$-\mu_0 \frac{\partial H(t)}{\partial t} = \nabla \times E(t)$$

where $\nabla \times E(t)$ denotes curl of the electrical field generated by the alternating magnetic field The inventors recognize, however, that the weak coupling that exists between the primary and secondary may be considered as a stray inductance. This stray inductance, in turn, increases the reactance, which itself may hamper the energy transfer between primary and secondary.

The transfer efficiency of this kind of weakly coupled system can be improved by using capacitors that are tuned to the precise opposite of the reactance of the operating frequency. When a system is tuned in this way, it becomes a compensated transformer which is resonant at its operating frequency. The power transfer efficiency is then only limited by losses in the primary and secondary. These losses are themselves defined by their quality or Q factors.

Compensation of stray inductance may also be considered as part of the source and load impedance matching in order to maximize the power transfer. Impedance matching in this way can hence increase the amount of power transfer.

Figure 1:
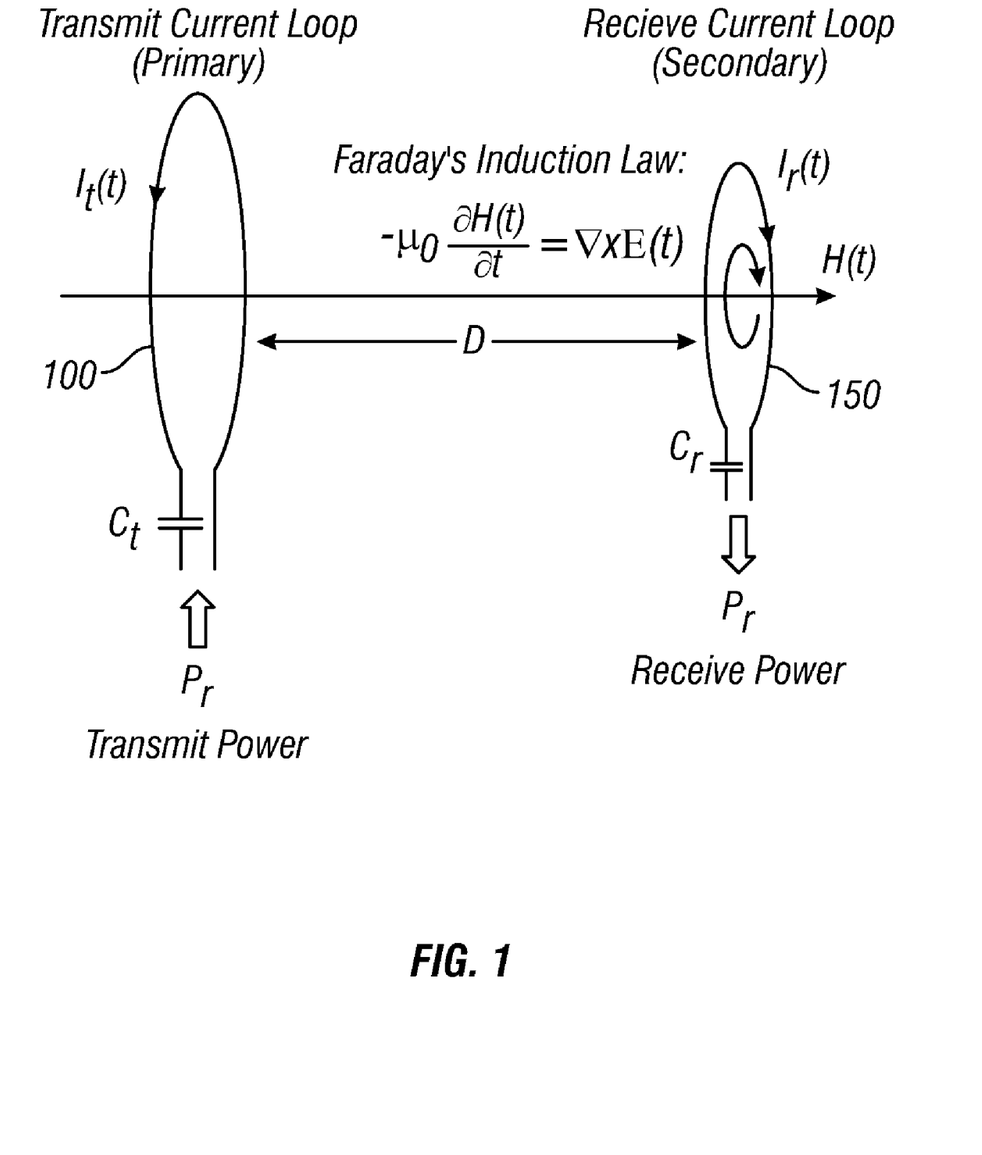
FIG. 1 shows a block diagram of induction between transmit and receive loops.

FIG. 1 illustrates impedance matching between the transmit and receive portions of a non-radiative system.

As the distance D between the transmitter 100 and the receiver 150 increases, the efficiency of the transmission can decrease. At increased distances, larger loops, and/or larger Q factors may be used to improve the efficiency. However, when these devices are incorporated into a portable device, the size of the loop may be limited by the parameters of the portable device.

Efficiency can be improved by reducing antenna losses. At low frequencies such as less than 1 MHz, losses can be attributed to imperfectly conducting materials, and eddy currents in the proximity of the loop.

Flux magnification materials such as ferrite materials can be used to artificially increase the size of the antenna. Eddy current losses are inherently reduced by concentrating the magnetic field.

Special kinds of wire can also be used to lower the resistance, such as stranded or litz wire at low frequencies to mitigate skin effect.

An alternative to non-radiative transfer uses a magneto mechanical system as described in our co-pending application Ser. No. 12/210,200, filed Sep. 14, 2008. This picks up energy from the magnetic field, converts it to mechanical energy, and then reconverts to electrical energy using Faraday's induction law.

According to an embodiment, the magneto mechanical system may be part of an energy receiving system that receives energy from an alternating magnetic field.

According to an embodiment, the magneto mechanical system is formed of a magnet, e.g. a permanent magnet, which is mounted in a way that allows it to oscillate under the force of an external alternating magnetic field. This transforms energy from the magnetic field into mechanical energy.

Assume a charged particle moving at a velocity $\gamma$ and a magnetic field H.

$$F = q\mu_0 (v \times H)$$

In an embodiment, this oscillation uses rotational moment around an axis perpendicular to the vector of the magnetic dipole moment m, and is also positioned in the center of gravity of the magnet. This allows equilibrium and thus minimizes the effect of the gravitational force. A magnetic field applied to this system produces a torque of $$T = \mu_0 (m \times H)$$

This torque aligns the magnetic dipole moment of the elementary magnet along the direction of the field vector. The torque accelerates the moving magnet(s), thereby transforming the oscillating magnetic energy into mechanical energy.

Figure 2:
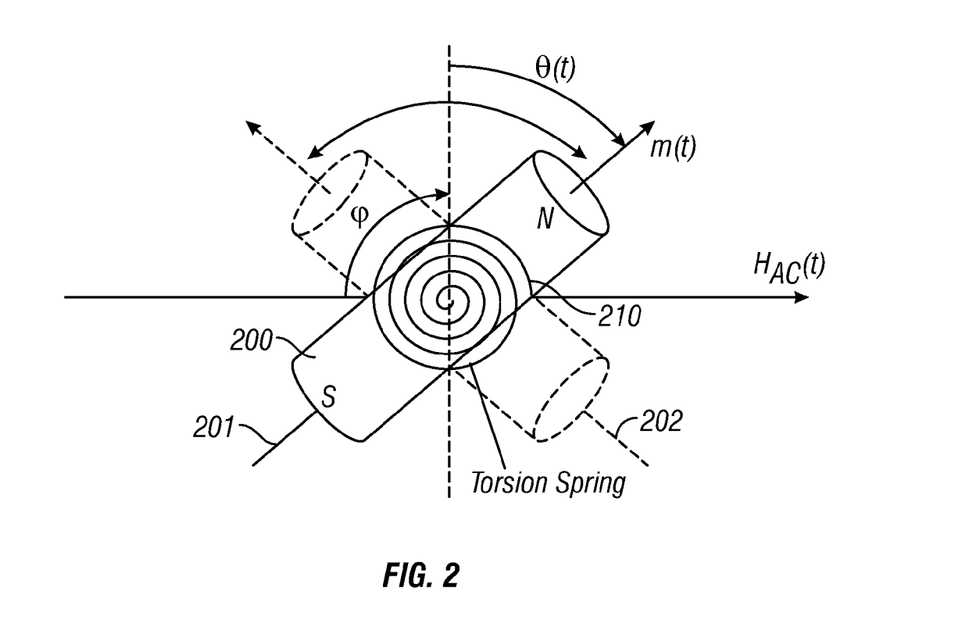
FIG. 2 shows an elemental torsion pendulum

The basic system is shown in FIG. 2. The magnet 200 is held in place by a torsion spring 210. This torsion spring holds the magnet in position shown as 201 when no torque from the magnetic field is applied. This no-torque position 201 is considered $\theta = 0$.

Magnetic torque causes the magnet 200 to move against the force of the spring, to the position 202, against the force of the spring with spring constant $K_R$. The movement forms an inertial moment I that creates a torsion pendulum that exhibits a resonance at a frequency proportional to the square root of the ratio $K_R$ over I.

Frictional losses and electromagnetic radiation is caused by the oscillating magnetic dipole moment.

If this system is subjected to an alternating field $H_{AC}$ at the resonance of the system, then the torsion pendulum will oscillate with an angular displacement data depending on the intensity of the applied magnetic field.

According to another embodiment, some or all of the torsion spring is replaced by an additional static magnetic field $H_{DC}$. This static magnetic field is oriented to provide the torque $$T=\mu_0(m \times H_{DC})$$

Another embodiment may use both the spring and a static magnetic field to hold the device.

Figure 3:
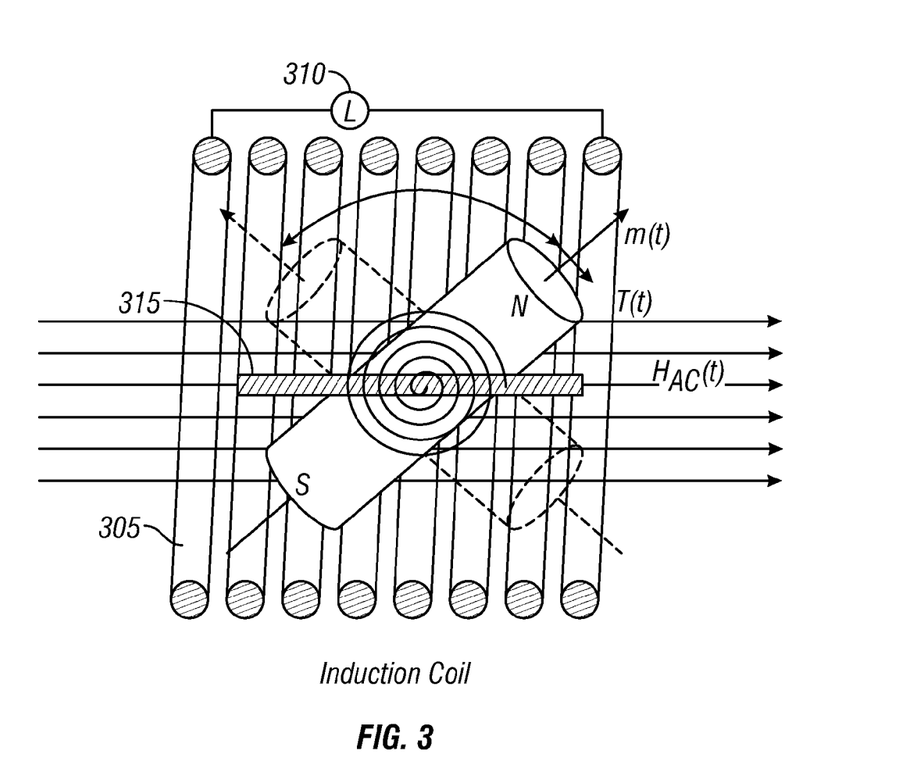
FIG. 3 shows a dynamo receiver.

The mechanical energy is reconverted into electrical energy using ordinary Faraday induction e.g. the Dynamo principle. This can be used for example an induction coil 305 wound around the magneto electrical system 200 as shown in FIG. 3. A load such as 310 can be connected across the coil 305. This load appears as a mechanical resistance. The load dampens the system and lowers the Q factor of the mechanical oscillator. In addition, when the coil has a load across it, the eddy currents in the magnets may increase. These eddy currents will also contribute to system losses.

In an embodiment, the Eddy currents are produced by the alternating magnetic field that results from the coil current. Smaller magnets in the magneto system may reduce the eddy currents. According to an embodiment, an array of smaller magnets is used in order to minimize this eddy current effect.

A magneto mechanical system will exhibit saturation if the angular displacement of the magnet reaches a peak value. This peak value can be determined from the direction of the external H field or by the presence of a displacement stopper such as 315 to protect the torsion spring against plastic deformation. This may also be limited by the packaging, such as the limited available space for a magnet element.

According to one embodiment, optimum matching is obtained when the loaded Q becomes half of the unloaded Q. According to an embodiment, the induction coil is designed to fulfill that condition to maximize the amount of output power.

Figure 4A:
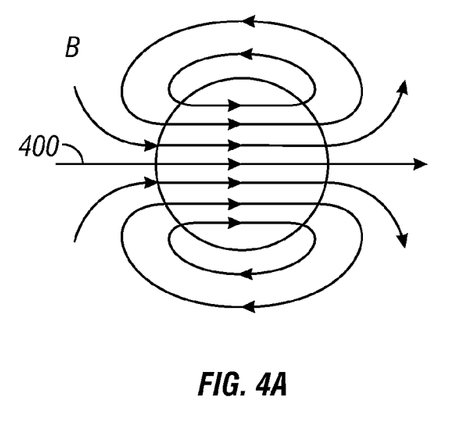
FIGS. 4A and 4B show flux and field strength within a sphere.
Figure 4B:
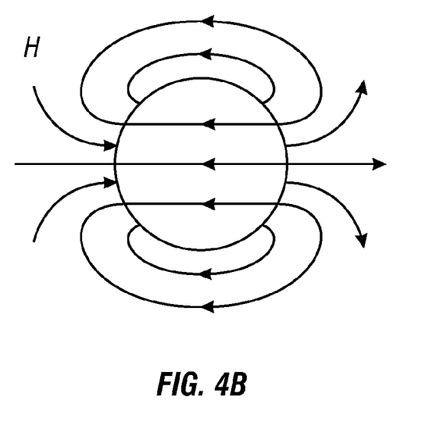

When using an array of such moving magnets, there may be mutual coupling between the magnets forming the array. This mutual coupling can cause internal forces and demagnetization. According to an embodiment, the array can be radially symmetrical, e.g., spheroidal, either regular or prolate, as shown in FIGS. 4A and 4B. FIG. 4A shows the parallel flux lines of a magnetized sphere. This shows the magnetic flux density B. FIG. 4B shows the magnetic field strength in a magnetized sphere. From these figures that can be seen that there is effectively zero displacement between magnets in a spheroid shaped three-dimensional array.

Therefore, the magnets are preferably in-line with the axis of the spheroid shown as 400. This causes the internal forces to vanish for angular displacement of the magnets. This causes the resonance frequency to be solely defined by the mechanical system parameters. A sphere has these advantageous factors, but may also have a demagnetization factor is low as ⅓, where an optimum demagnetization factor is one. Assuming equal orientation of axes in all directions, a disc shaped array can also be used. Discs have a magnetization factor that is very high, for example closer to 1.

Magnetization factor of a disc will depend on the width to diameter ratio. The shaped elements also have a form factor that is more suitable for integration into a device, since spheroids have a flat part that may be more easily used without increasing the thickness of the structure The following is a comparison of magneto-mechanical systems with classical ferrimagnetic materials (ferrites). Ferrimagnetic materials or ferrites may be modeled as a magneto-mechanical system or conversely, magneto-mechanical systems may be considered as ferrites with special properties that may not be achievable with the classical ferrite materials. This will be shown in the following:

In ferrimagnetic substances, the magnetic moments of adjacent atoms are aligned opposite like in antiferromagnetic materials but the moments do not fully compensate so that there is a net magnetic moment. However, this is less than in ferromagnetic materials that can be used for permanent magnets.

Even though there are weaker magnetic effects, some of these ferrimagnetic materials, known as ferrites, have a low electrical conductivity. This makes these materials useful in the cores of AC inductors and transformers since induced eddy currents are lower.

A low electrical conductivity can also be found in a magneto-mechanical system composed of a multitude of small elementary magnets that are mutually electrically isolated so that eddy currents are attenuated.

The crystalline Ferromagnetic and ferrimagnetic materials are typically structured in magnetic domains also called Weiss domains. Atoms in a domain are aligned so that a net magnetic moment results. These domains may be considered as the magnets of a magneto-mechanical system.

In many magnetic materials, to a varying degree, the domain magnetization tends to align itself along one of the main crystal directions. This direction is called the easy direction of magnetization and represents a state of minimum energy. In a ferrite material, the directions of crystal domains may be considered randomly oriented so that there is complete cancellation and the resultant net magnetic moment at macroscopic level is zero, if no external magnetic field is applied. This is in contrast to the magneto-mechanical systems where the "elementary" magnets are equally oriented.

To rotate the magnetic moment of a crystalline domain in another (non-easy) direction, a certain force and work is required depending on the angle of rotation. Such work is performed if the ferrimagnetic material is subjected to an external magnetic field. The underlying physical phenomenon is Lorentz force applied to the magnetic moment, as described above.

The torsion spring (mechanical or magnetic) of a magneto-mechanical system sets the magnetic orientation of domains back to their state of minimum energy. If the external field is removed, it may be considered as the torsion spring of a magneto-mechanical system. Since crystal domains in ferrites have different shapes and sizes, they appear as different spring constants. Another embodiment uses elementary oscillators which all have an equal spring constant.

Stronger external fields cause more domains to be aligned or better aligned to the direction given by the external magnetic field. This effect is called magnetic polarization. This may be mathematically expressed as $$B=\mu_0 H+J=\mu_0(H+M)=\mu_0\mu_r H$$

where J is the magnetic polarization, M is the magnetization, and $\mu_r$ the relative permeability.

The magnetization effect may be considered as a magnification of the magnetic flux density at the receive location by the factor $\mu_r$ using rotatable magnetic moments. This principle of local magnification of magnetic flux density is inherent to the magneto-mechanical system described above. Thus a relative permeability may be attributed to a magneto-mechanical system. In a resonant system, this relative permeability will be a function of frequency and reaches a maximum close to the resonance frequency.

Another mechanism for changing the domain magnetization which may occur in ferrite materials is the direction of magnetization remains the same but the volumes occupied by the individual domains may change. This process, called domain wall motion, the domains whose magnetization direction is closest to the filed direction grow larger while those that are more unfavorably oriented shrink in size.

This kind of magnetization process differs from that of a magneto-mechanical system as described above. If the external magnetic field is continuously increased, the ferrite material will be progressively magnetized until a point of saturation is reached. Saturation is a state where net magnetic moments of domains are maximally aligned to the external magnetic field.

Magneto-mechanical systems, as described above, saturate when the angular displacement of elementary magnets reaches the maximum peak angular displacement. The dynamic behavior when an alternating external magnetic field is applied is different. For this purpose the magnetization process of a bulk ferrite material can be considered. Considering a typical magnetization curve (M as a function of the external field H) of a ferrite, three major regions can be identified in which the ferrite shows different dynamic behavior.

At low magnetization, domain wall movements and rotations are mainly reversible. Being reversible means that the original magnetization condition can be returned when the external field is increased and then again decreased to its original field strength, other than hysteresis effects.

The second region of the magnetization curve is one in which the slope of magnetization (M vs. H) is greater and in which irreversible domain wall motion occurs.

The third section of the curve is one of irreversible domain rotations. Here the slope is very flat indicating the high field strength that is required to rotate the remaining domain magnetization in line with the external magnetic field.

Irreversible domain wall motion or domain rotation explains the well known hysteresis in the magnetization curve that is presented by all ferrites in a more or less pronounced manner. Hysteresis means that the magnetization or the induction B lags relative to the external magnetic field. As a consequence, the induction B at a given field H cannot be specified without knowledge of the previous magnetic history of the ferrite sample. Thus hysteresis may be considered as memory inherent to the material.

The area included in a hysteresis loop is a measure of the magnetic losses incurred in a cyclic magnetization process e.g. as resulting from an alternating external magnetic field.

With respect to the application of wireless energy transfer, there will be a requirement to drive a ferrite at least into the second region of magnetization where hysteresis losses typically become significant. This requirement is different e.g. for a communication receiver antenna. This is, however, not further shown here.

At higher frequencies two major loss contributors can be identified in ferrite materials:
hysteresis losses due to irreversible domain changes; and
eddy current losses due to residual conductivity in the ferrite. Hysteresis losses increase proportionally with frequency as the energy to cycle once around the hysteresis loop is independent of the speed. Eddy current losses have the effect of broadening the hysteresis loop.

Magneto-mechanical systems using a torsion spring as described above are largely hysteresis-free, where irreversible effects are concerned. At higher frequencies eddy current losses must be expected too. At lower frequencies (<<1 MHz) a magneto-mechanical system has the potential to provide high Q-factors at levels close to saturation.

For alternating fields, a ferrite core material may be characterized by its complex permeability $$\mu=\mu'+j\mu''$$

The real and imaginary part represent the permeability with the magnetization in phase and in quadrature to the external field, respectively.

The two permeabilities can often be found plotted in data sheets for ferrite materials. Typically, the real component is fairly constant with frequency, rises slightly, then falls rapidly at higher frequencies. The imaginary component on the other hand first rises slowly and then increases quite abruptly where the real component is falling sharply.

The maximum in $\mu'$ that occurs shortly before cut-off is ferrimagnetic resonance. Ferrimagnetic resonance is an intrinsic property of a ferrite material and may be considered as the upper frequency at which the material can be used. It is also observed that the higher the permeability $\mu'$ of the material, the lower the frequency of the ferrimagnetic resonance. This phenomenon of resonance indicates domain rotation, a counter torque (spring), and a certain inertial moment. It can be shown that the resonance frequency depends on the so-called gyromagnetic ratio.

Ferrites show a resonance similar to a magneto-mechanical system however with a too low Q-factor so that this effect cannot be technically exploited to get materials with high permeability $\mu'$ at a specified frequency.

Gyromagnetic resonance with high Q-factors (up to 10,000) can be observed at microwave frequencies (>1 GHz) in certain ferrite materials (e.g. Yttrium Iron Garnets) if the material is subjected to strong static magnetic fields. This effect, which is based on electron spin precession, can be exploited to build microwave components such as circulators, isolators, high-Q filters and oscillators. Non-radiative energy transfer using coupled magnetic resonance in the microwave range would however be limited to extremely short range.

Gyromagnetic resonance may be considered as a magneto-mechanical system at the atomic level. A difference is however that magnetic moments are processing around the field lines of the static magnetic field rather than oscillating axially. In both cases there is, however, a moving magnetic moment and an angular displacement.

Therefore, it can be seen that the magneto mechanical systems can use ferrimagnetism and gyromagnetism as part of their energy transfer.

A magneto-mechanical system may be formed of a single permanent magnet or of a multitude (an array) of elementary magnets. Theoretical analyses shows that:
the ratio of magnetic moment-to-inertial moment increases with the number of elementary magnets. This ratio is similar to the gyromagnetic ratio known from ferromagnetism.

the performance of the magneto-mechanical system increases with this ratio of moments A figure of merit for the performance of a magneto-mechanical system $$k_c = \frac{P_{av}}{H_{AC}^2 V_S}$$

where $P_{av}$ denotes the power that is available under the condition of optimum matching, $H_{AC}$ is the external alternating magnetic field strength, and Vs the volume required by the magneto-mechanical system. This figure of merit, which is called the specific power conversion factor, is indicative of how much power per unit system volume can be extracted from an alternating magnetic field, $H_{AC}$, if penduli are perpendicularly oriented to the direction of the exciting magnetic field.

Theoretical analysis using the assumption of rod magnets of length $l_{em}$ shows that for a given system Q-factor and operating frequency, the specific power conversion factor increases inversely proportional to $l_{em}^2$; and thus to $N_e^{2/3}$ where $N_e$ is the number of elementary oscillators fitting into the unit system volume. This equation does not hold for items in saturation, which means that the angular displacement of the torsion penduli is not limited by stoppers. This is a very interesting result indicating the advantage of an array of elementary magnets over a single oscillating magnet.

Higher specific power conversion factors can have lower field strengths where the system saturates.

As a consequence of saturation, at a given frequency there exists an upper bound for the available power per unit system volume, which depends on
  the maximum peak angular displacement $\theta_{peak}$
  the strength of the external alternating magnetic field $H_{AC}$.

Theory shows that this upper bound linearly increases with $H_{AC}$. This upper bound is an important design parameter for a magneto-mechanical system. It also shows that there exists some degree of freedom to design magneto-mechanical systems as long as the ratio $$\frac{Q_{UL} \cdot H_{AC}}{l_{em}^2}$$

remains constant, where $Q_{UL}$ is the unloaded Q-factor of the magneto-mechanical system.

The above analysis shows that using an array of micro magneto-mechanical oscillators enables the design of a system with a performance better than anything achievable in practice with a single macro oscillator. A macro sized oscillator would require an extremely high Q-factor that could not be realized in a mechanical system.

Figure 5:
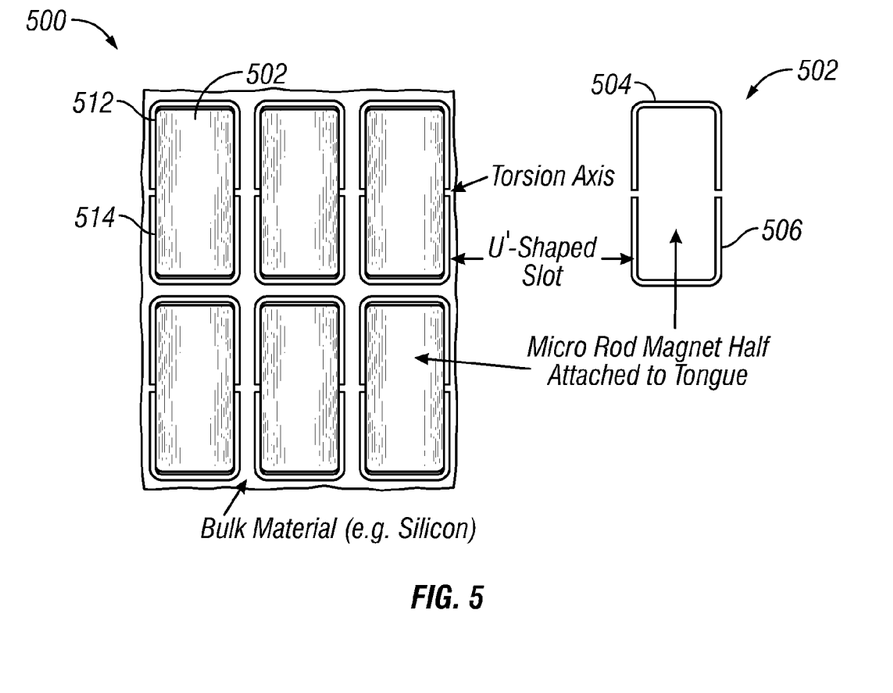
FIG. 5 shows an integrated embodiment.

Another embodiment uses micro-electromechanical systems (MEMS) to create the magneto mechanical systems. FIG. 5 shows one embodiment of forming an array of magneto mechanical oscillators using MEMS technology.

An array 500 may be formed of a number of magnet elements such as 502. Each magnet elements 502 is formed of two U-shaped slots 512, 514 that are micro-machined into a silicon substrate. A permanent rod magnet 504, 506 of similar size is formed within the slots. The magnet may be 10 μm or smaller. At the micrometer level, crystalline materials may behave differently than larger sizes. Hence, this system can provide considerable angular displacement e.g. as high as 10°. This may provide the ability to increase the Q factor of such a system.

The magnet itself may be on the order of 10 μm or smaller. These devices may be formed in a single bulk material such as silicon. The magnets 504, 506 can have a high magnetization e.g. higher than 1 Tesla.

The magnet itself is composed of two half pieces, one piece attached to the upper side and the other piece attached to the lower side. Preferably these devices are mounted so that the center of gravity coincides with the rotational axes.

The device may be covered with a low friction material, or may have a vacuum located in the area between the tongue and bulk material in order to reduce type the friction.

Figure 6:
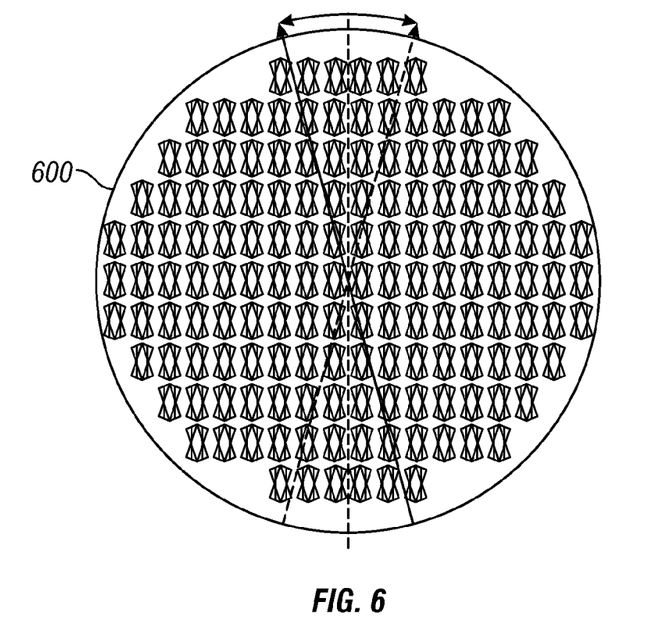
FIG. 6 shows a disc shaped array.

FIG. 6 shows a cut through area of a three-dimensional array of magnets. In one embodiment, the array itself is formed of a radial symmetric shape, such as disc shaped. The disc shaped array of FIG. 6, 600 may provide a virtually constant demagnetization factor at virtually all displacement angles. In this embodiment, an induction coil may be wound around the disc to pick up the dynamic component of the oscillating induction field generated by the MEMS-magneto mechanical system. The resulting dynamic component of the system may be expressed as $$m_x(t) = |m| \cdot \sin \theta(t) \cdot e_x$$

Figure 7:
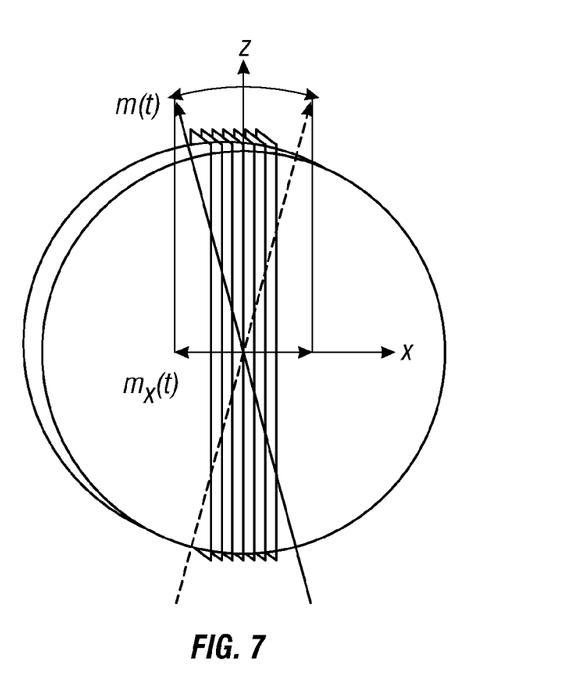
FIG. 7 illustrates how a coil can be wound around the disc shaped array.

FIG. 7 illustrates how the induction coil can be wound around the disc.

Mathematical equations for the power that can be transferred through a magneto-mechanical system per unit system volume can be derived in terms of
  system parameters such as geometry (e.g. size or number of elementary oscillators)
  material properties
  frequency
  external alternating magnetic field strength Equations for the maximum available power are determined under the constraints of a limited angular displacement and Q-factor of the magneto-mechanical oscillator.

These equations analyze the potential of magneto-mechanical systems and to find optimum design parameters.

A primary system parameter is a parameter that is independent of any other parameter of the set and thus cannot be expressed as a function of another parameter.

To analyze the system, the following set of primary parameters have been chosen:
  $V_S$: Volume of magneto mechanical system [m³].
  $l_{em}$: Length of elementary rod magnet [m]
  $\rho_{em}$: Length-to-radius ratio of elementary magnet
  $v_{em}$: Specific volume of elementary magnet in [m³/kg]
  $H_{em}$: Internal magnetic field strength of elementary magnet [A/m]
  α: Fill factor (Ratio of total magnetic volume to system volume)
  $Q_{UL}$: Unloaded Q-factor of mechanical resonator(s). It includes the losses due to mechanical friction, radiation, and due to conversion from mechanical to electrical energy.
  $\theta_{peak}$: Maximum peak displacement angle of magnet rod supported by the mechanical resonator [rad] ______ $f_0$: Resonance frequency [Hz]
  $H_{AC}$: Externally applied alternating magnetic field [A/m]
  $P_{av\_mech}$: Available mechanical power. (maximum power into load)

Secondary system parameters and physical quantities include:
  $r_{em}$: Radius of elementary rod magnet [m] ($=l_{em}/\rho_{em}$)
  $V_{em}$: Volume of an elementary magnet $=l_{em}^3 \pi/\rho_{em}$ $V_e$: Volume required by an elementary system (resonator) (=$V_{em}/\alpha$)

$N_e$: Number of elementary magnets in system volume=$V_s/V_e$

I: Moment of inertia of elementary magnet [kg m$^2$]. It is a function of $v_{em}$, $l_{em}$, and $\rho_{em}$ $K_r$: Torsion spring constant [kg m$^2$ s$^{-2}$]. It is a function of $Q_{UL}$, $f_0$, and I $\Gamma_s$: Dynamic rotational friction (angular velocity proportional to torque) representing all system losses [kg m$^2$ s$^{-1}$]. It is a function of $Q_{UL}$, $f_0$, and I and includes the losses due to mechanical friction, radiation, and due to conversion from mechanical to electrical energy.

$\Gamma_L$: Load equivalent dynamic rotational friction [kg m$^2$ s$^{-1}$].

$\bar{\omega}$: Angular velocity of oscillating elementary system m: magnetic moment (vector) [Am$^2$]. It is a function of $l_{em}$, $\rho_{em}$, and $H_{em}$ θ: Displacement angle [rad]

φ: Angle between magnetic moment vector at zero displacement and vector of externally applied alternating magnetic field [rad]

There is an analogy between linear electrical systems composed of inductances, capacitances, and resistances; and a rotational mechanical system formed of a torsion spring, inertial moment, and dynamic friction (angular velocity proportional to torque). This analogy is shown in Table 1.

TABLE 1

| Electrical system | | Rotational mechanical system |
|---|---|---|
| Physical quantities: | | |
| I (current) | ⇔ | T (torque) |
| U (voltage) | ⇔ | $\bar{\omega}$ (angular velocity) |
| Component parameters: | | |
| L | ⇔ | 1/$K_r$ |
| C | ⇔ | I |
| $R_p$ | ⇔ | 1/Γ |
| Resonance frequency: | | |
| $f_0 = \dfrac{1}{2\pi\sqrt{LC}}$ | ⇔ | $f_0 = \dfrac{1}{2\pi}\sqrt{\dfrac{K_r}{I}}$ |
| Unloaded Q (parallel circuit): | | |
| $Q_{UL} = R_p\sqrt{\dfrac{C}{L}}$ | ⇔ | $Q_{UL} = \dfrac{1}{\Gamma}\sqrt{K_r I}$ |

Derivations of equations are shown below. From the resonance condition one gets the torsion spring constant:

$$K_r = (2\pi f_0)^2 I$$

It is assumed that the optimum matching condition $$\Gamma_L = \Gamma_S$$

can be achieved with the magneto-electrical transducer (induction coil plus±load). From Q-factor equation (see Table 1), the dynamic frictions become:

$$\Gamma_s = \Gamma_L = \frac{\sqrt{K_r I}}{Q_{UL}} = \frac{2\pi f_0 I}{Q_{UL}}$$

Using above defined parameters, the magnetic moment of an elementary magnet may be expressed as:

$$m = V_{em} \cdot H_{em}$$

and the moment of inertia:

$$I = \frac{V_{em} \cdot l_{em}^2}{12 v_{em}}$$

Based on the well-known torque equation above, the RMS value of the driving torque becomes:

$$T = m \cdot \mu_0 H_{AC} \cdot \sin(\phi)$$

Applying Kirchhoffs node law provides the following relation between the torques in the circuit.

$$T - T_{K_r} - T_I - T_{\Gamma_S} - T_{\Gamma_L} = 0$$

At resonance frequency, we get by definition:

$$T_{K_r} = -T_I$$

hence $$T = T_{\Gamma_S} + T_{\Gamma_L}$$

and from matching condition:

$$T_{\Gamma_l} = \frac{T}{2}$$

The available mechanical power per elementary system may now be simply expressed as:

$$T_{\Gamma_L} = \frac{T}{2}$$

Using the above equations, the following relation on the total power available from the entire magneto mechanical system can be obtained $$P_{av\_mech} = \frac{3}{2\pi} \cdot \frac{\mu_0^2 H_{em}^2 Q_{UL} v_{em} V_s \alpha}{f_0 l_{em}^2} \cdot (H_{AC} \cdot \sin(\varphi))^2$$

This equation indicates that for given $Q_{UL}$ and frequency, the available power increases inversely proportionally to the length of an elementary rod magnet, disregarding the resulting angular displacement. For the peak angular displacement of an elementary oscillator we get:

$$\theta_{peak} = \frac{3\sqrt{2}}{2\pi^2} \cdot \frac{\mu_0 H_{em} Q_{UL} v_{em}}{f_0^2 l_{em}^2} \cdot H_{AC} \cdot \sin(\varphi)$$

indicating that the peak angular displacement at given Q-factor and frequency increases inversely proportional to the length of an elementary rod magnet thus setting some constraints on the external magnetic field strength $H_{AC}$ and therefore also on the power that can be extracted from the external magnetic field. Introducing a maximum angular displacement constraint leads to a relation for the frequency-magnet length product:

$$f_0 \cdot l_{em} = \left( \frac{3\sqrt{2}}{2\pi^2} \cdot \frac{\mu_0 H_{em} Q_{UL} \nu_{em}}{\theta_{peak}} \cdot H_{AC} \cdot \sin(\varphi) \right)^{\frac{1}{2}}$$

Using the constraint on the peak angular displacement (saturation), an interesting equation on the maximum available power can be obtained:

$$P_{av\_mech} = \frac{\pi}{\sqrt{2}} \cdot \mu_0 H_{em} V_s \alpha f_0 \theta_{peak} \cdot H_{AC} \cdot \sin(\varphi)$$

This equation may also be expressed in terms of the total magnetic moment $m_{tot}$ of the magneto-mechanical system and the external magnetic induction $B_{AC}$ as follows:

$$P_{av\_mech} = \frac{1}{2}(2\pi f_0) \cdot |m_{tot} \times B_{AC}| \cdot \frac{\theta_{peak}}{\sqrt{2}}$$

This equation is not anymore dependent on Q-factor, and length of rod magnet, which indicates a certain degree of freedom in the design of magneto-mechanical systems. These parameters however are hidden or implicit to the peak angular displacement $\theta_{peak}$.

The maximum available power linearly increases with frequency. This behavior can also be found in systems that are directly based on Faraday's Induction law.

A useful definition to quantify performance of a magneto-mechanical system is the specific power conversion factor that has already been described.

$$k_c = \frac{P_{av\_mech}}{H_{AC}^2 V_S} = \frac{3}{2\pi} \cdot \frac{\mu_0^2 H_{em}^2 Q_{UL} \nu_{em} \alpha}{f_0 l_{em}^2} \cdot \sin\varphi$$

as well as the saturation field strength:

$$H_{AC\_sat} = \theta_{peak} \left( \frac{3\sqrt{2}}{2\pi^2} \cdot \frac{\mu_0 H_{em} Q_{UL} \nu_{em}}{f_0^2 l_{em}^2} \cdot \sin(\varphi) \right)^{-1}$$

A system may be designed for a high $k_c$, compromising with a lower saturation level.

Conversely, a system may be designed for a higher saturation level compromising with a lower $k_c$.

Numerical Example

For a numerical example, the following parameters are assumed:
$V_S = 4 \cdot 10^{-6}$ m³ (=4 cm³ equivalent to a disk with a diameter of 4 cm and thickness of 3.1 mm)
$\nu_{em} = 131.6 \cdot 10^{-6}$ m³/kg
$H_{em} = 1T/\mu_0$ A/m
$\alpha = 0.25$
$Q_{UL} = 1000$
$\theta_{peak} = 0.175$ rad (~10°)
$\phi = 0$
The frequency of major interest is f=135 kHz.
The field strength of major interest is $H_{AC} = 5$ A/m
The power theoretically linearly increases with frequency. It must be noticed however that at higher frequencies power may be additionally limited by other factors such as maximum stored oscillatory energy in the system, mechanical strain, etc. This is not considered in this analysis.

The available power as a function of the external alternating magnetic field strength can be computed for different length of the elementary magnets.

A system using rod magnets of 20 µm length saturates at approximately 2.5 W while a system using 10 µm rod length saturates at a lower value of about 600 mW. The 10 µm system however is more sensitive (higher specific power conversion factor) than the one that uses 20 µm rods. This can be checked at a field strength of 5 A/m.

Based on this example, one can see that a disc shaped system with 4 cm diameter 3 mm thickness can extract up to 260 mW from a magnetic field of 5 amps per meter at 135 kHz.

Although only a few embodiments have been disclosed in detail above, other embodiments are possible and the inventors intend these to be encompassed within this specification. The specification describes specific examples to accomplish~more general goal that may be accomplished in another way. This disclosure is intended to be exemplary, and the claims are intended to cover any modification or alternative which might be predictable to a person having ordinary skill in the art. For example, other sizes, materials and connections can be used. Other structures can be used to receive the magnetic field. In general, an electric field can be used in place of the magnetic field, as the primary coupling mechanism. Other kinds of magnets and other shapes of arrays can be used.

Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A system, comprising:
    an array of magneto-mechanical oscillators, each oscillator comprising a magnetic symmetrical part held by a torsion element and configured to rotate relative to and against a force of the torsion element in response to a torque induced by an electromagnetic field; and
    a coil positioned around the array and electromagnetically coupled to the oscillators, the oscillators configured to produce an electric current in the coil.

2. The system as in claim 1, wherein said torsion element is responsive to a magnetic field.

3. The system as in claim 1, wherein said torsion element includes both a magnetic field and also includes a mechanical spring.

4. The system as in claim 1, wherein said magnetic symmetrical part is radially symmetrical.

5. The system as in claim 4, wherein said magnetic symmetrical part is disc shaped having a first part that is round in cross-section.

6. The system as in claim 1, wherein said array of oscillators is arranged in a disc shape.

7. The system as in claim 1, wherein each said oscillator has a size of less than 10 µm.

8. The system as in claim 1, wherein said coil is an induction coil.

9. The system as in claim 1, wherein said coil inductively receives energy from said oscillators.

10. The system as in claim 1, wherein said coil has a near field resonance with said oscillators.

11. The system as in claim 1, wherein said torsion element includes a spring that is biased normally to a first angular position, and moved to another angular position by said electromagnetic coupling.

12. The system of claim 1, wherein each oscillator comprises a micro electro-mechanical structure.

13. A system, comprising:
a plurality of magnetic elements, each of the plurality of magnetic elements comprising a movably mounted part;
a source of a static magnetic field, said static magnetic field located in an area to force at least one of the plurality of magnetic elements towards a specified rotation position, said static magnetic field being sufficiently weak as to allow the at least one of the plurality of magnetic elements to move under influence of an applied magnetic field; and
an electric energy conversion element configured to produce an electric output based on said movement of the at least one of the plurality of magnetic elements against the static magnetic field.

14. The system as in claim 13, wherein said static magnetic field comprises a field which resists movement of the at least one of the plurality of magnetic elements.

15. The system as in claim 14, further comprising a spring to reduce movement of the at least one of the plurality of magnetic elements.

16. The system as in claim 13, wherein each of the plurality of magnetic elements is rotatably mounted.

17. The system as in claim 13, wherein each of the plurality of magnetic elements is radially symmetrical.

18. The system as in claim 17, wherein each of the plurality of magnetic elements is disc shaped having a first part that is round in cross-section.

19. The system as in claim 13, wherein at least one of the plurality of the magnetic elements is part of an array of magnetic elements.

20. The system as in claim 19, wherein said electric energy conversion element comprises a coil, said coil being common to each of the magnetic elements of said array of magnetic elements.

21. The system as in claim 19, wherein said array of magnetic elements is arranged in a disc shape.

22. A method, comprising:
rotating at least one magneto mechanical oscillator relative to and against a force of a torsion element holding the magneto mechanical oscillator in response to a torque induced by an electromagnetic field;
producing an electric current in an electric energy conversion element, based on electromagnetic coupling with the oscillators; and
outputting the electric current for producing output power.

23. The method as in claim 22, wherein said oscillator has a size of less than 10 µm.

24. The method as in claim 22, wherein said electric energy conversion element comprises an induction coil.

25. The method as in claim 22, wherein said electric energy conversion element inductively receives energy from said oscillator.

26. The method as in claim 22, wherein said electric energy conversion element is configured to be near field resonant with said oscillator.

27. The method as in claim 22, wherein said torsion element includes a spring that is biased normally to a first angular position, and moved to another angular position by said electromagnetic coupling.

28. The method of claim 22, wherein said electric energy conversion element comprises a coil structure.

29. The method of claim 22, wherein said magneto mechanical oscillator comprises a micro electro-mechanical structure.

30. A method, comprising:
moving at least one of the magneto mechanical oscillator relative to and against a force of a torsion element holding the magneto mechanical oscillator in response to a torque induced by an electromagnetic field, the torsion element comprising a fixed magnetic field;
producing an electric current in an electric energy conversion element, based on electromagnetic coupling with the oscillator; and
outputting the electric current for producing output power.

31. The method as in claim 30, further comprising using both the fixed magnetic field and a mechanical spring as said torsion element.

32. The method of claim 30, wherein said electric energy conversion element comprises a coil structure.

33. A system for power generation, comprising:
a magnetic element held by a torsion element and configured to rotate in response to a torque induced by a magnetic field, relative to and against a force caused by the torsion element;
means for conducting an electric current produced by the rotation of the magnetic element.

34. The system of claim 33, the means for conducting the electric current comprises a coil.

35. A system for power generation, comprising:
a magnetic element configured to rotate in response to a torque induced by an applied magnetic field against a force caused by a fixed magnetic field;
means for conducting an electric current produced by the rotation of the magnetic element against the fixed magnetic field.

36. The system of claim 35, wherein the means for conducting the electric current comprises a coil.

* * * * *